US007990375B2

United States Patent
Kohli et al.

(10) Patent No.: US 7,990,375 B2
(45) Date of Patent: Aug. 2, 2011

(54) VIRTUAL VIEW SCHEMATIC EDITOR

(75) Inventors: Vikas Kohli, Noida (IN); Parag Choudhary, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 248 days.

(21) Appl. No.: 11/395,290

(22) Filed: Apr. 3, 2006

(65) Prior Publication Data
US 2007/0229537 A1    Oct. 4, 2007

(51) Int. Cl.
*G06T 15/00* (2011.01)
(52) U.S. Cl. .................... 345/419; 345/418; 345/619
(58) Field of Classification Search .................... None
See application file for complete search history.

(56) References Cited

U.S. PATENT DOCUMENTS

| | | | | |
|---|---|---|---|---|
| 5,463,563 A * | 10/1995 | Bair et al. | ...................... | 716/104 |
| 6,738,957 B2 * | 5/2004 | Gont et al. | ...................... | 716/11 |
| 6,791,336 B2 * | 9/2004 | Krigel | ............................ | 324/539 |
| 6,848,090 B2 * | 1/2005 | Jain et al. | ...................... | 716/103 |
| 6,996,513 B2 * | 2/2006 | Bellam | ......................... | 703/14 |
| 7,110,929 B1 * | 9/2006 | Meares | ......................... | 703/14 |
| 7,231,623 B2 * | 6/2007 | Miller | ........................... | 716/103 |
| 2002/0018583 A1 * | 2/2002 | Gont et al. | ..................... | 382/113 |
| 2002/0023107 A1 * | 2/2002 | Gont et al. | ..................... | 707/504 |
| 2003/0097372 A1 * | 5/2003 | Bertini et al. | .............. | 707/104.1 |

* cited by examiner

*Primary Examiner* — Said Broome
(74) *Attorney, Agent, or Firm* — Kenyon & Kenyon LLP

(57) ABSTRACT

Embodiments of the present invention provide a virtual-view schematic editor for use in CAD systems. In response to a user request, the editor selects elements from a CAD database, determines the connectivity between the elements, and renders the elements on a single display. Virtual views may be created and stored for later re-use within the system.

25 Claims, 11 Drawing Sheets

FIG. 10
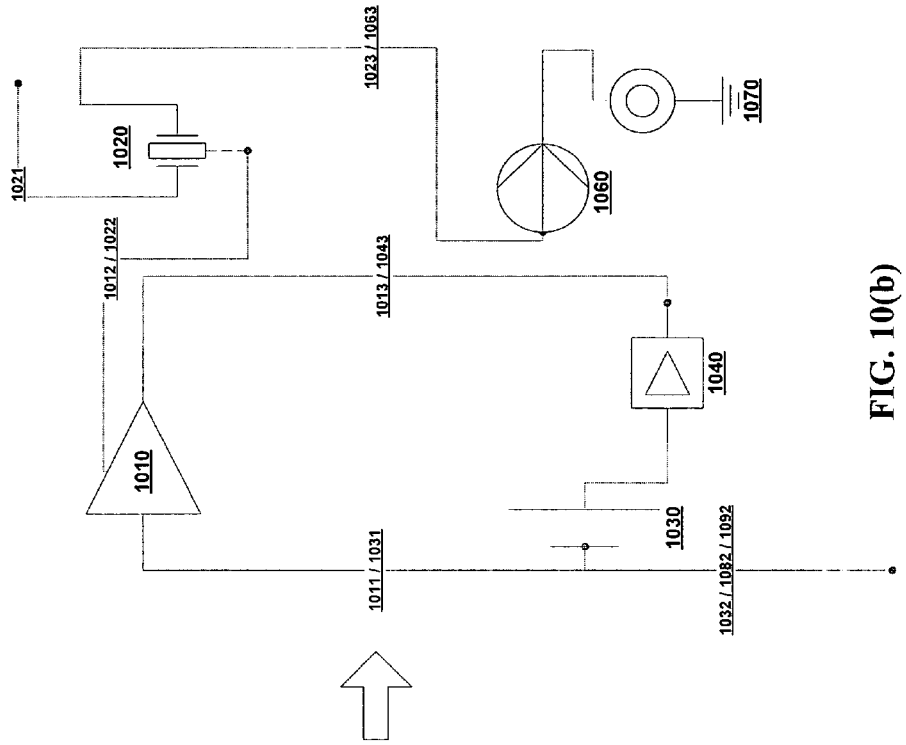
FIG. 10(b)
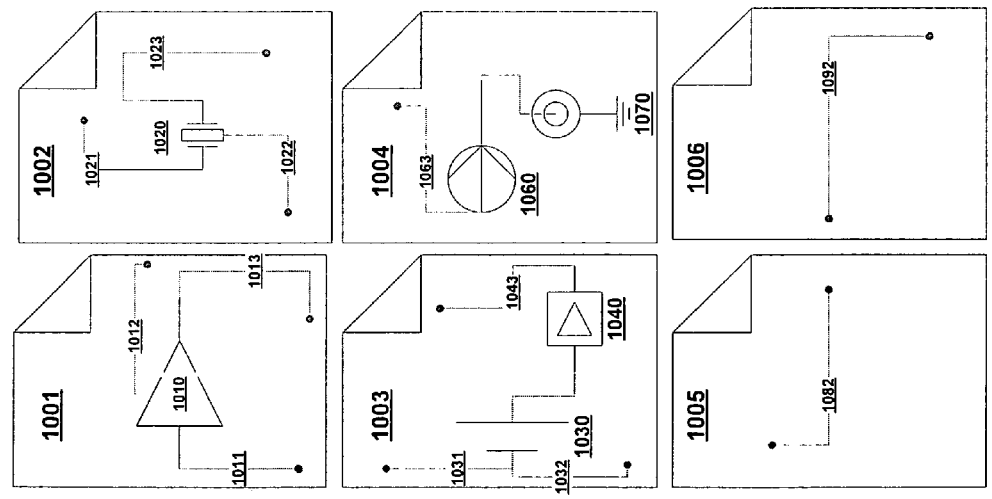
FIG. 10(a)

VIRTUAL VIEW SCHEMATIC EDITOR

BACKGROUND

Various methods for circuit design are commonly used. Examples of these methods include hardware description languages, schematic methods, and table-based methods. Schematic methods are preferred, because they allow for a graphical view of circuits during the design process and therefore convey a clearer meaning of the design than other methods. For large circuit designs, computer-aided design (CAD) programs divide a circuit schematic into pages, with each page representing a portion of the circuit being designed. The pages which represent a CAD drawing are often stored in a CAD database. Due to the division of a drawing into pages, the pages may not correspond to physical, logical, or functional subsystems of the circuit. Such division may also prohibit a global view of the entire architecture of the circuit.

As circuits have become more complex, schematic circuit design has become increasingly more difficult. It may be necessary to store a complex circuit design in hundreds of pages in order to encompass the entire circuit. This may distribute circuit functionality across multiple pages, requiring users to traverse multiple pages to, for example, verify the connectivity between components in the circuit. Such processes may be error-prone, for example if a user incorrectly traces a connection while traversing multiple pages. As more functionality is included in a chip, there is a substantial increase in pin count and design complexity. This may result in even a single component being spread across multiple pages.

Often when creating a new chip or circuit design, a user will begin by copying an existing design and introducing modifications. However, schematic editors generally only allow copying operations at the page level. Therefore users may have to add or delete elements by hand after an initial design is created. Schematic editors also generally do not allow copying or other operations to be performed on a subset of elements based on their functionality. Therefore when an entire page is copied and some functionality present in the original page needs to be removed from or reconstructed in the copy, the chance of errors is greatly increased.

Similar problems arise when a user wishes to simulate an element of a CAD drawing. Often a user will wish only to simulate a subset of the entire schematic, as simulation of the entire design may be too complex to be useful or feasible. A user may create a copy of the entire schematic, and then remove elements the user wants to exclude from the simulation prior to creating a simulation. Such simulations may therefore be error-prone as discussed above. There is also a possibility that the process of copying and modifying the schematic will result in a simulation that does not accurately reflect the original system.

In a typical CAD system, shown in FIG. 1, a schematic editor 120 is used to display data from a CAD database 110 on a display 130. The schematic editor 120 may determine which elements of the CAD database 110 will be used based on user input 140. The schematic editor 120 includes a graphics rendering engine 121 and an input controller 122. The graphics rendering engine 121 may translate information from the CAD database 110 to a display 130 for rendering schematics. Elements stored in the CAD database 110 typically are organized on pages, as previously described. The input controller 122 captures user input 140 and allows manipulation of data on the display 130. Generally a graphical interface will display only a single page at a time, requiring uses to view multiple pages in order to perform complex operations. Therefore the system described with respect to FIG. 1 may not be well-suited to manipulate large, complex circuits or chips as described above. Due to the use of page-based schematics to store schematics, a user may be required to traverse multiple pages in order to view or manipulate a single element or subsystem.

FIGS. 2-5 show a user interface in a typical CAD program. In FIG. 2, an example of a system schematic is shown within a single display. However, it is clear that a user is unable to discern specific objects or connections in this view. FIG. 3 shows a "zoomed" view of a particular signal in the system shown in FIG. 2. A user is able to see specific structures, connections or signals, but cannot see, for example, the entire structure of a subsystem. For example, signal 310 may extend across multiple pages, windows, or other display segment. This may require the user to view or scroll through multiple pages in order to view the entire subsystem. FIGS. 4 and 5 show additional views of signal 310 as a user views multiple pages. FIGS. 4 and 5 may each represent a single page as displayed by a typical CAD application. Each page may include multiple signals or other objects, and the objects may also extend across multiple pages. This may require a user to traverse many pages in order to view, modify, or verify a single element. For example, in FIGS. 3-5 a user must view three pages in order to trace the connectivity of signal 310.

DESCRIPTION OF THE DRAWINGS

FIG. 10 is an illustration of a selection of pages and elements in a CAD drawing.

DETAILED DESCRIPTION

Figure 1:
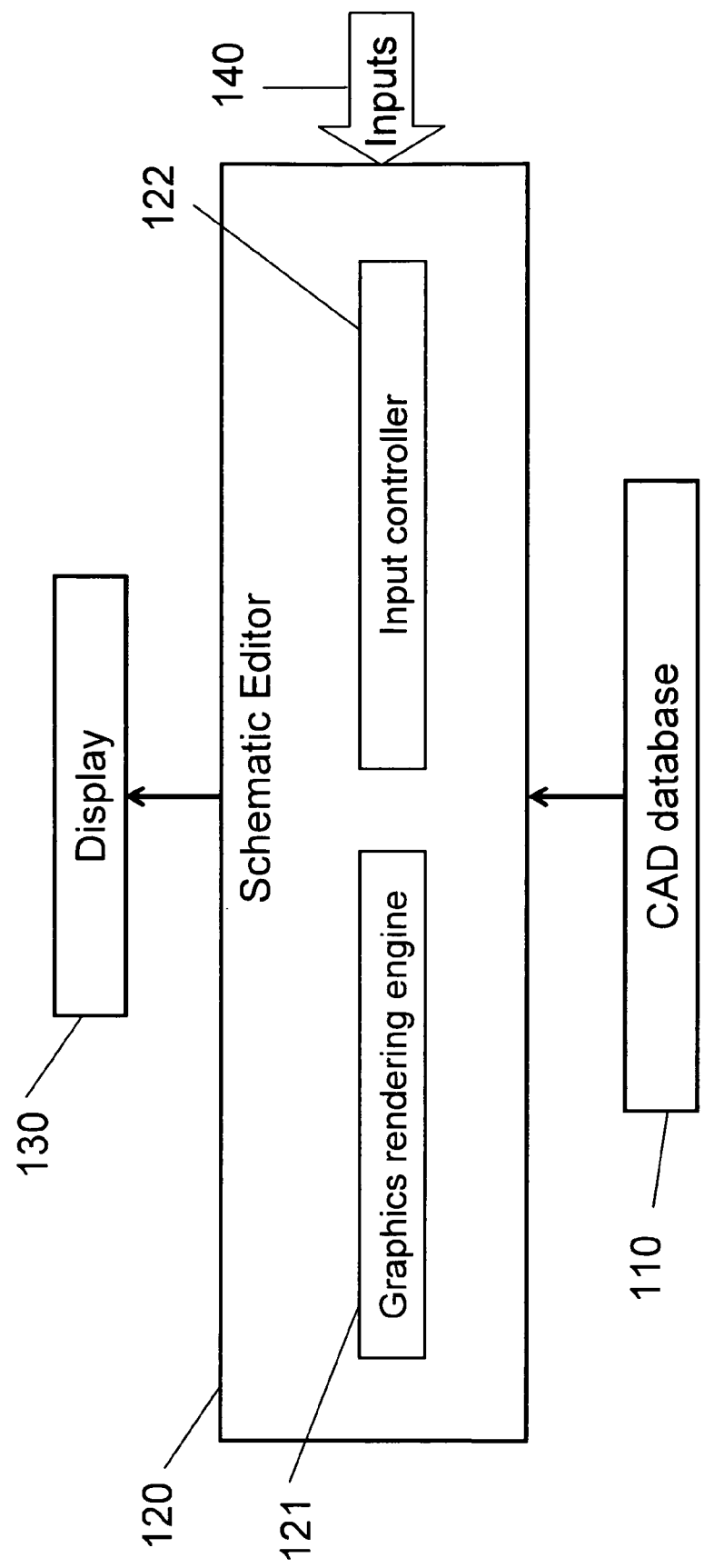
FIG. 1 is a block diagram of a standard CAD system.
Figure 2:
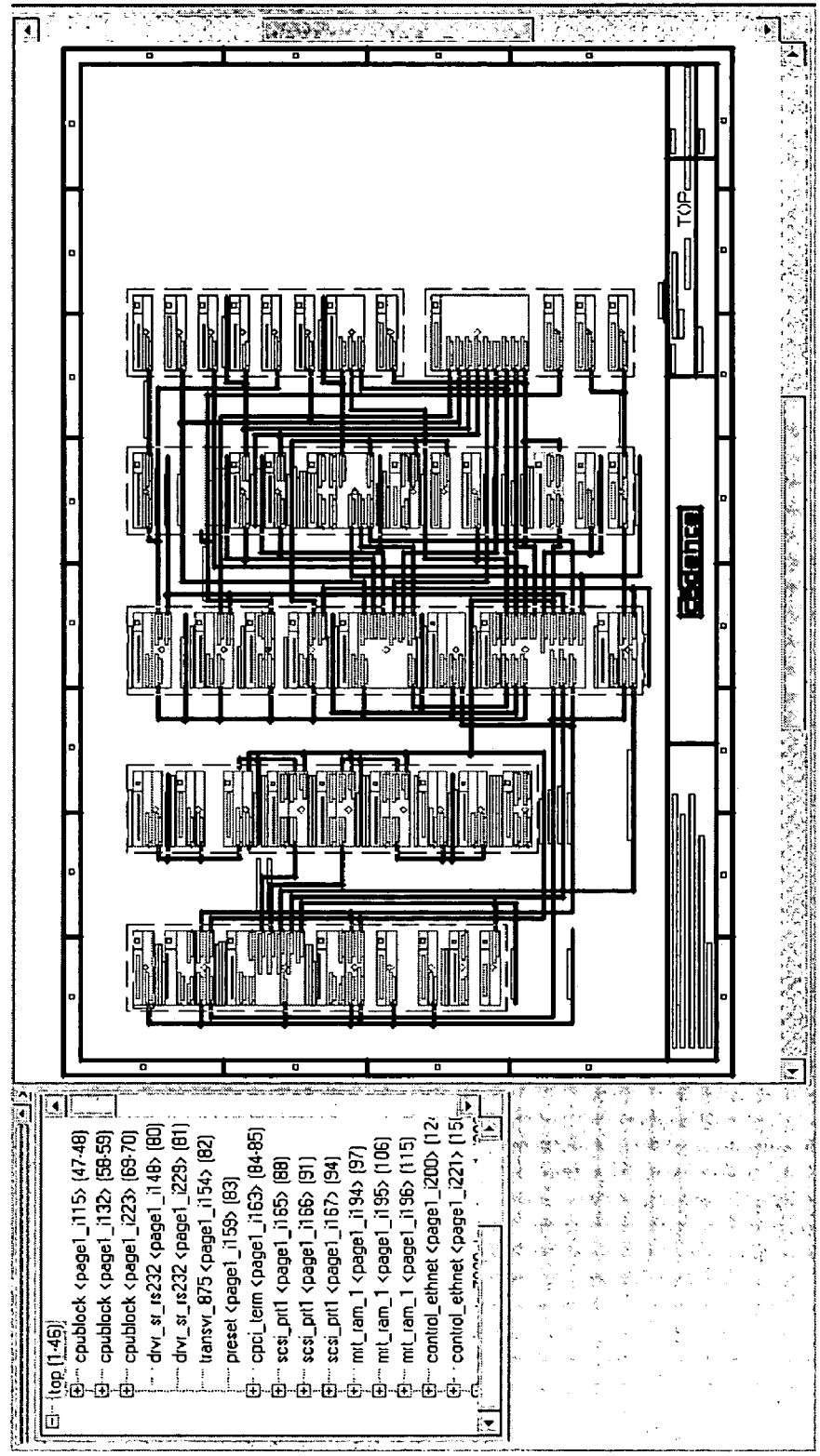
FIGS. 2-5 show displays in a standard CAD user interface.

Embodiments of the present invention provide a virtual-view schematic editor (VVSE) for use in CAD systems. A system comprising a VVSE may allow a user to select circuit elements based on a variety of criteria, such as functional, logical, or hierarchical relationships. A user may select elements that are stored on multiple pages, and manipulate those elements from a single display. An element may be any item within a schematic, such as a component, a net, a page from a page-based system, a connection between components, or a group of components, connections, pages, and/or nets. The system may create a virtual view that allows a user to view and manipulate only desired elements without traversing multiple pages. It may further allow a user to view and manipulate elements on the same or different levels of a page hierarchy without traversing those pages or the hierarchy. As used herein, a "virtual view" is a description of a circuit or part of a circuit or other object that may be designed or rendered with a design program, such as a CAD program, or a collection of information about such an object. Virtual views will be understood to include "direct connections" between elements, i.e., connections as they are stored on CAD drawing pages, and "virtual connections," i.e., connections between elements that may be displayed in place of the connections as they are stored in the CAD drawing pages without loss of functionality. For example, a connection between two elements of a integrated circuit design may be represented as a connector that extends across several pages of the schematic drawing, and thus the schematic may define terminals at page boundaries to represent interconnections therebetween. In a virtual view, the VVSE may represent such a connection as a continuous connection between the elements without breaks or terminations corresponding to page boundaries. A virtual view may be visible to a user when shown on a display. A view may also be stored in a computer-readable medium such as volatile memory, long-term storage, or a database. A view may be manipulated by a VVSE based on user input, or it may be manipulated independent of user input. The virtual view may allow for automated connection verification, simplified simulation of circuit subsystems, and revision tracking and review. The VVSE may apply rules to select elements and connections for display in a virtual view. Such rules may be based on user input, or they may be pre-determined. The VVSE of the present invention may be carried out by computer-executable instructions, such as program modules, and may be stored in a machine-readable medium.

The use of virtual views as opposed to schematic pages may be desirable for a number of reasons. For example, it may allow users to define specific views of elements or subsystems; the system may use user specifications in order to select, extract, and present relevant information from multiple pages on a single display. The system may further allow users to specify functional descriptions of elements, to allow for later selection of elements and nets belonging to the function, regardless of whether the relevant elements span multiple hierarchies and pages. Netlists of functionally- or logically-related elements may also be created from within virtual views.

Figure 6:
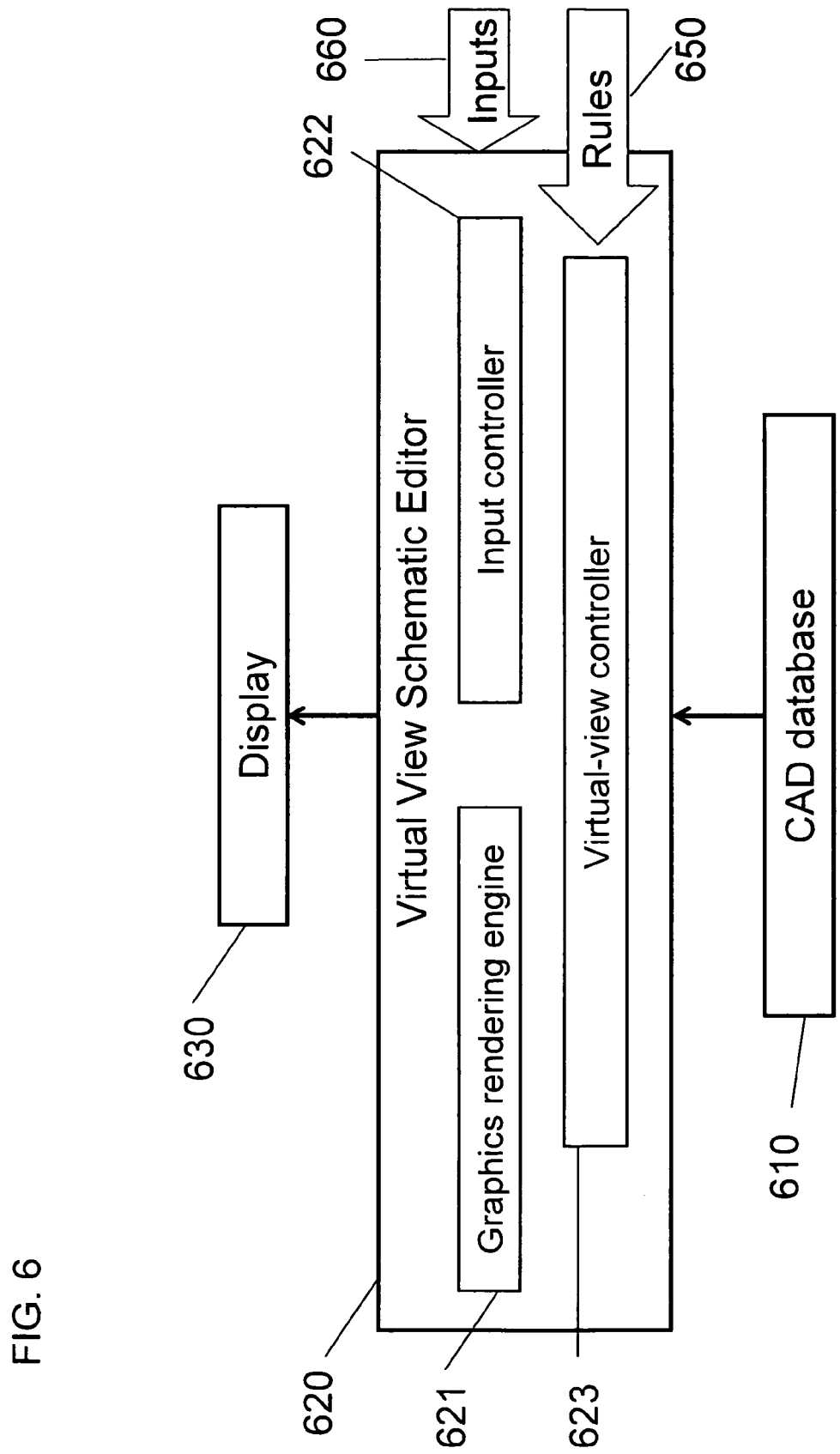
FIG. 6 is a block diagram of a CAD system incorporating a virtual view schematic according to an embodiment of the present invention.

In an embodiment of the present invention, shown in FIG. 6, a virtual view schematic editor (VVSE) 620 may be used to select data from a CAD database 610 and display data on a display 630. The VVSE 620 may include a graphics rendering engine 621, an input controller 622, and a virtual-view controller 623. The virtual-view controller 623 may select data from a CAD database 610 based on user input 660 and rules 650. The rules may be created by the user or generated by the VVSE 620 based on user inputs. The virtual-view controller 623 may determine the form in which data should be rendered on the display 630, specific commands to be executed in response to user input 660, and relationships between data objects extracted from the CAD database 610. These relationships may be determined from at least the data in the CAD database 610, user input 650, and pre- or user-defined rules 650. The virtual-view controller 623 may maintain connections on separate pages or blocks of the schematic and direct rendering of connections on the display 630. The rendering may be provided on a single workspace display, which may span one or more display devices that may be available on the computing platform on which the VVSE 620 executes. The graphics rendering engine 621 translates data into a schematic rendered on the display 630 based on directions from the virtual-view controller 623. The input controller 622 may capture user input 660 and provide input 660 to the virtual-view controller 623.

A VVSE may provide a graphical user interface having an "infinite canvas." The VVSE provides a freestyle CAD editor which permits an operator to view or enter CAD elements into a schematic, without having to manage arbitrary constraints on the arrangement of elements that are introduced by page divisions. CAD elements and systems viewed on an infinite canvas may be manipulated as if the user was manipulating a single page in a page-based CAD system. At arbitrary points during the design process, a user may command the VVSE to render schematics of the elements entered. The VVSE may introduce page boundaries to the canvas workspace and realign schematic elements to accommodate the page borders. For example, the VVSE may move elements away from page borders to make them easier to review and manage. Similarly, the VVSE may determine appropriate page arrangement for elements entered via the infinite canvas that are then stored in a page-based system.

Figure 7:
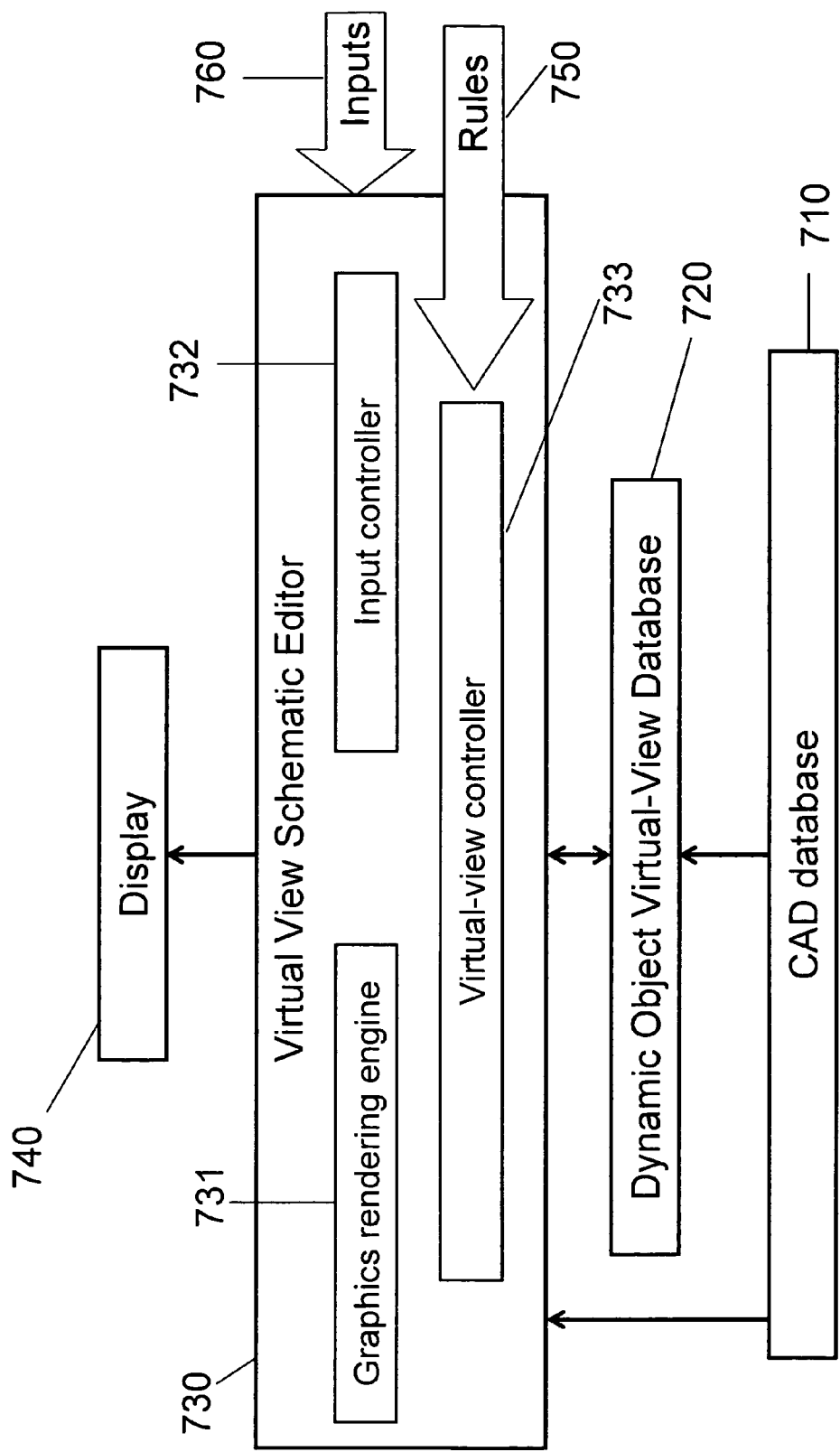
FIG. 7 is a block diagram of a CAD system incorporating a virtual view schematic editor and a dynamic object virtual-view database according to an embodiment of the present invention.

FIG. 7 displays another embodiment of the present invention. The VVSE 730 may store data selected from a CAD database 710 in a dynamic object virtual-view database 720. In some embodiments, data selected by the VVSE 730 from the CAD database 710 may be stored in volatile memory. In other embodiments, it may be stored on a physical medium such as a hard disk. Selection criteria may include user input 760 and pre- or user-defined rules 750. The VVSE 730 may capture user input using an input controller 732 and display selected data on a display 740 using the graphics rendering engine 731. Use of a dynamic virtual-view database may be desirable in order to speed construction and rendering of CAD schematics or objects. It may also allow the user to create additional virtual views after an initial virtual view is created, without requiring direct access to the CAD database 710.

Figure 3:
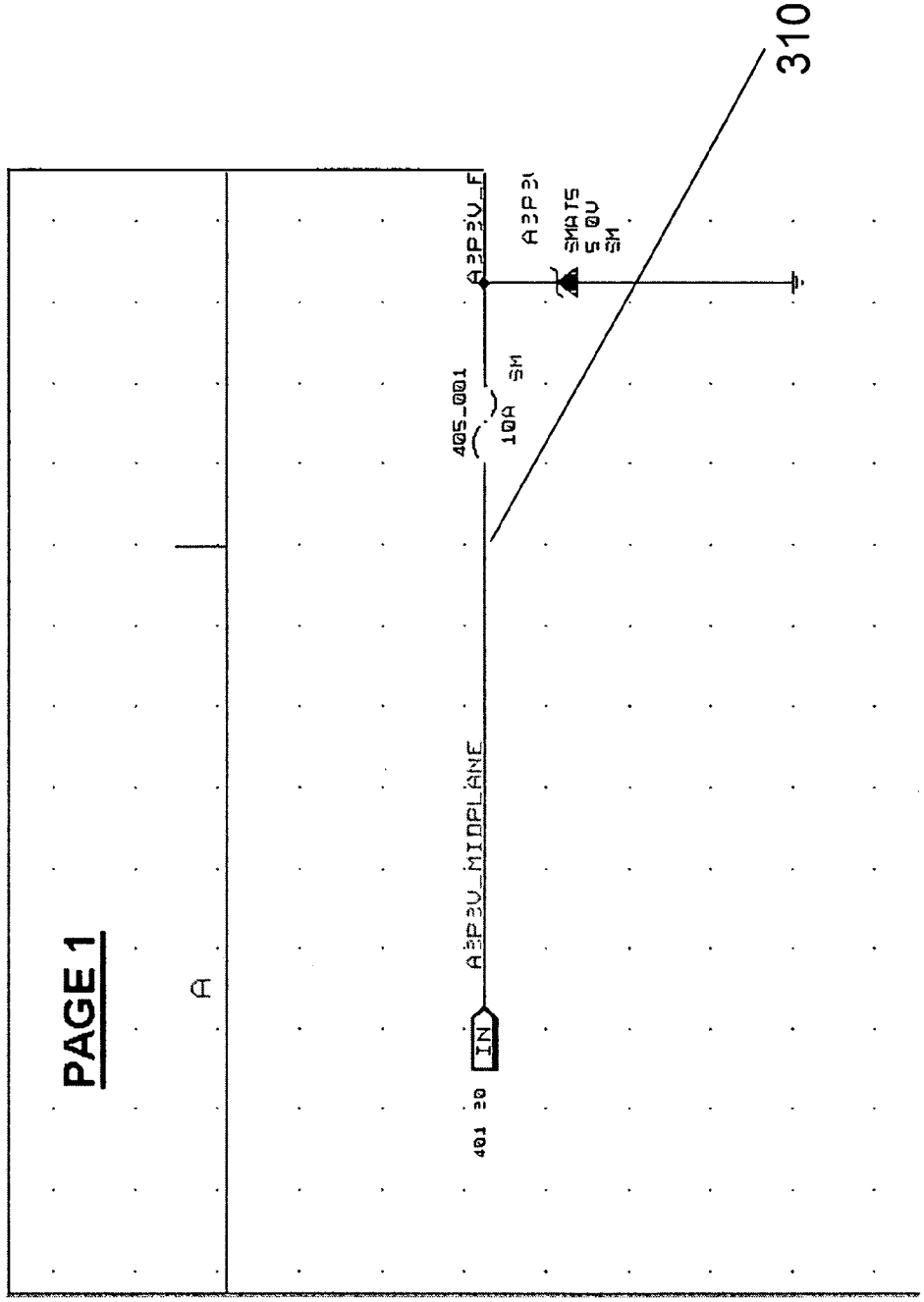
Figure 4:
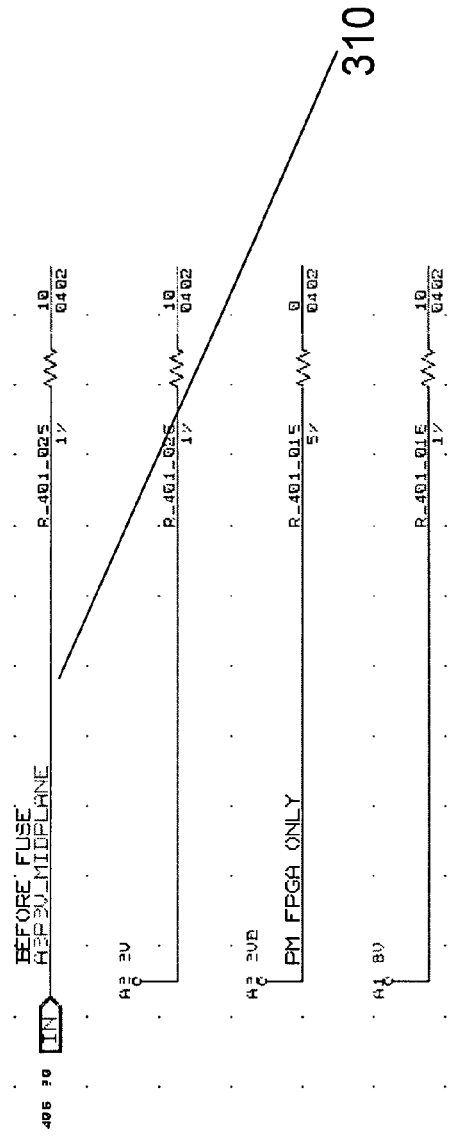
Figure 5:
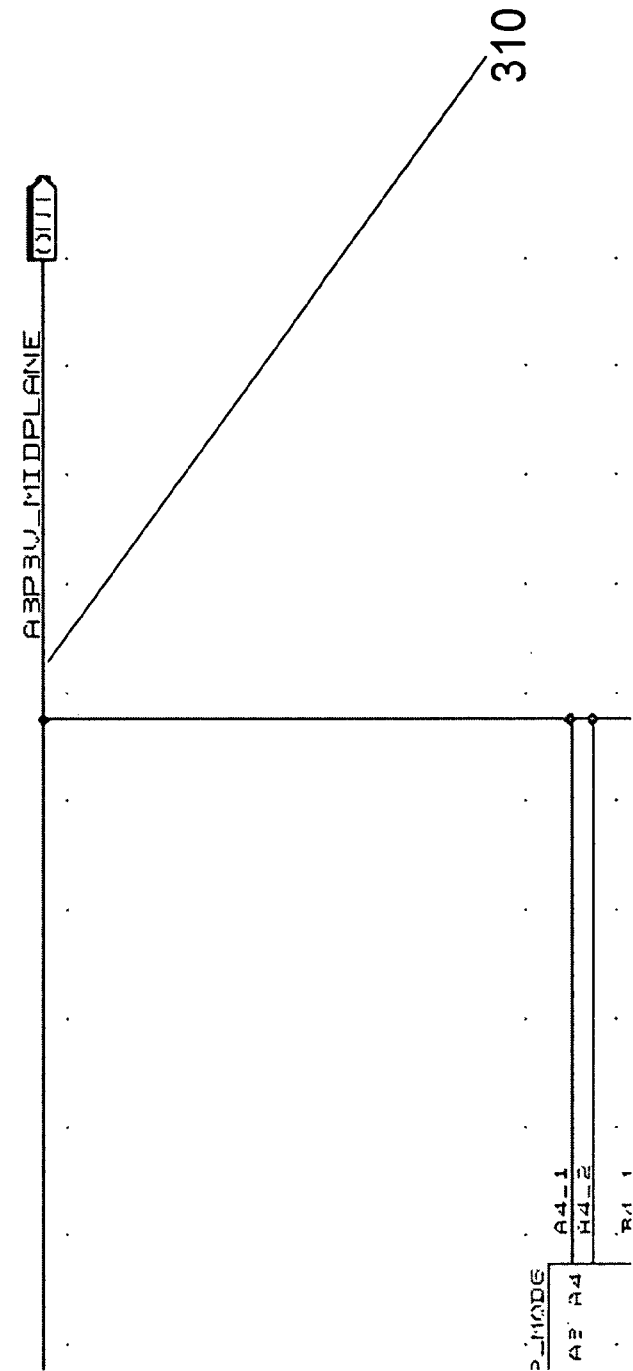
Figure 8:
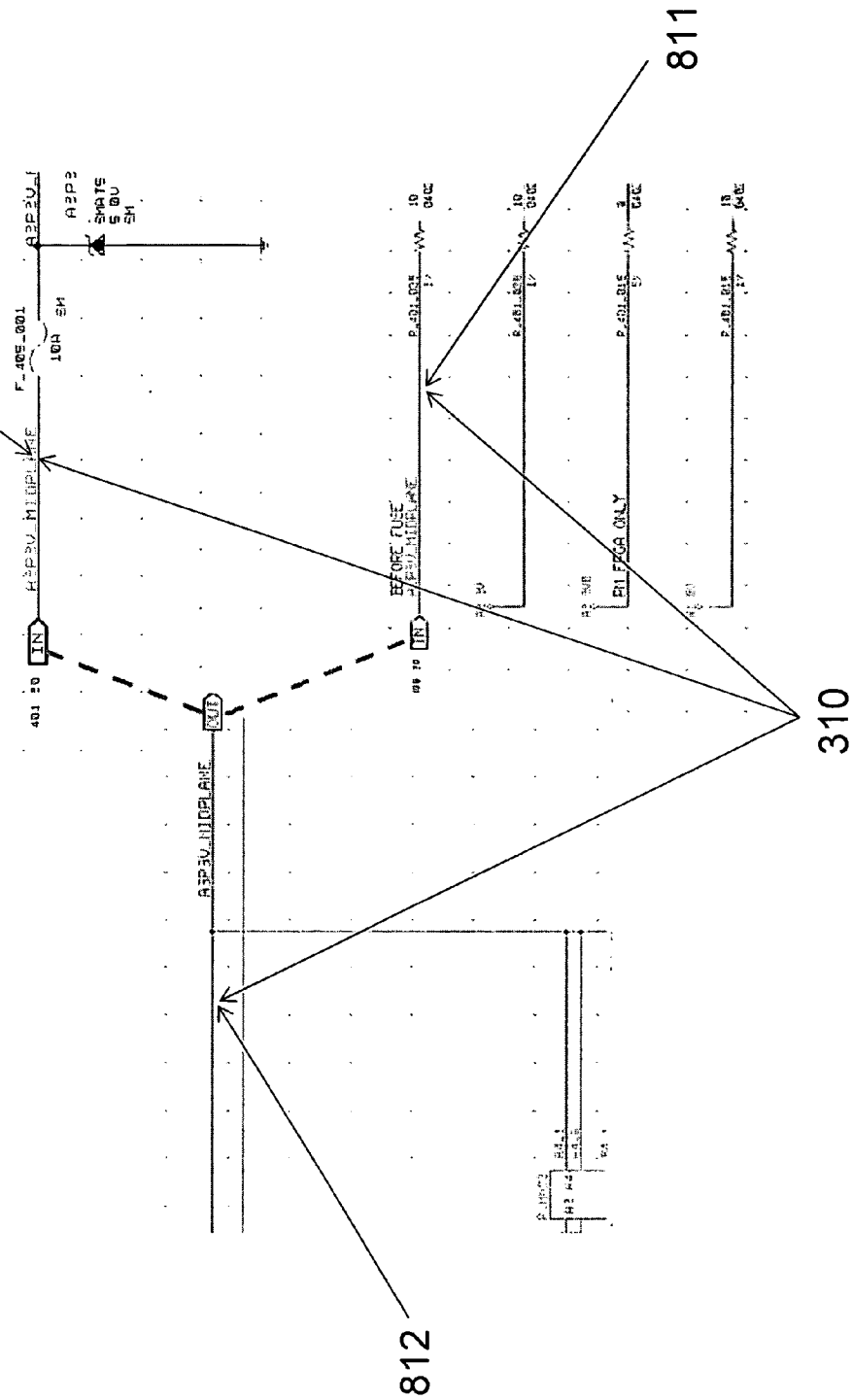
FIG. 8 is a display of a user interface according to an embodiment of the present invention.

FIG. 8 shows a user interface in a CAD program according to an embodiment of the present invention. In the example illustrated by FIG. 8, a VVSE displays a signal 310, which would normally be displayed across multiple pages, on a single display. A user is therefore able to view the entire structure of a signal 310. Multiple signal sections 810, 811, and 812 represent the portions of signal 310 that were shown in FIGS. 3-5, respectively. A VVSE displays the signal 310 in its entirety, without changing the position of the signal 310 in the system. It does not require a user to scroll through or view multiple pages in order to see the entirety of the signal 310. The signal 310 may be stored in a virtual view, such that functional or physical connections related to the signal 310 are available to the user. The user may be able to specify elements related to the signal 310 to be included in another virtual view or simulation. The system may also allow the user to modify a signal 310 from the virtual view, even though the signal 310 is stored on multiple pages. Such modifications may be made transparently to the portions of the signal 310 stored on each page.

Moreover, a user may now simulate a signal 310 from the user interface and observe the entire signal operation without having to page through multiple pages, as in traditional CAD programs. The signal 310 and/or other elements related to the signal 310 may also be exported for use in an external tool.

Figure 9:
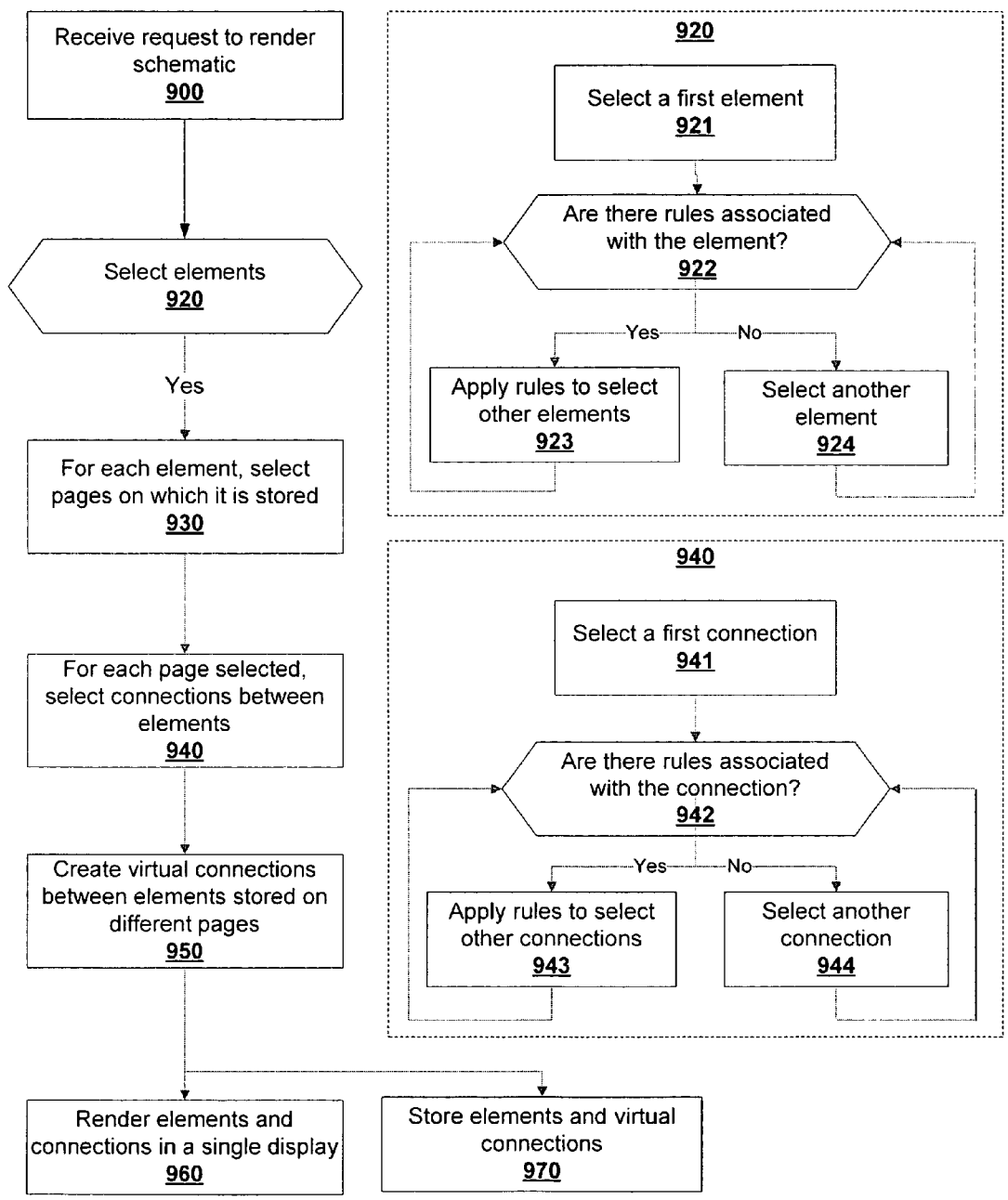
FIG. 9 is an illustration of a process according to an embodiment of the present invention.

FIG. 9 illustrates a process for generating a schematic in a single display of a CAD user interface using a VVSE according to an embodiment of the present invention. First, a system may receive (900) a request to render a CAD drawing element. The system may select (910) one or more elements from a CAD database. This selection may be made by selecting a first element (921) and applying rules to the first element (922) to select other elements (923). Other elements may also be selected (924) based on user input or other factors. The system may then select pages (930) on which the selected element or elements are stored. After determining on which pages the selected elements are stored, the system may select connections between those elements (940). A VVSE may apply rules to select connections in the same manner used to select elements (941-944). The system may then create virtual connections (950) between the elements selected, based on the connections selected from the CAD database. That is, the system may determine what connections are present between the selected elements, and how the connections should be virtually rendered within a single display. Such connections may extend across multiple schematic pages in the CAD drawing. The selected elements and connections may then be rendered (960) on a single display. The elements and virtual connections may also be stored (970) for later use, for example in a dynamic virtual-view database.

FIG. 10 shows a sample schematic as manipulated by an embodiment of the present invention. FIG. 10(a) shows a portion of a CAD drawing comprising several pages 1001-1006. The elements 1010, 1020, 1030, 1040, 1050, and 1060 may represent individual elements, or they may represent parts of elements. For example, elements 1020 and 1060 may together represent a single element that is stored on pages 1002 and 1004. Similarly, each of the illustrated elements may represent a plurality of sub-elements. Connections that span multiple pages may be displayed as connections that are terminated at page boundaries. For example, connections 1011 and 1031 may represent a connection between elements 1010 and 1030. Each connection is displayed with a terminal point at the page boundary. FIG. 10(b) shows the same elements as those in 10(a) as they may be displayed by embodiments of the present invention. For clarity, connections between elements are labeled using the same indicators as in FIG. 10(a). As illustrated by FIG. 10(b), the VVSE may display selected elements and the connections between them. Terminal points where connections extended across multiple pages may be replaced with virtual connections between elements. For example, connection 1013/1043 may be a virtual connection between elements 1010 and 1040. The VVSE system may make such virtual connections based on the connections stored in the CAD drawing. Virtual connection 1013/1043, for example, may be determined by connections 1013 and 1043 and associated connectivity information stored in the CAD database. It will be understood that the circuit represented by FIG. 10 is intended as an illustration only, and is not intended to represent a specific or functional circuit.

Figure 11:
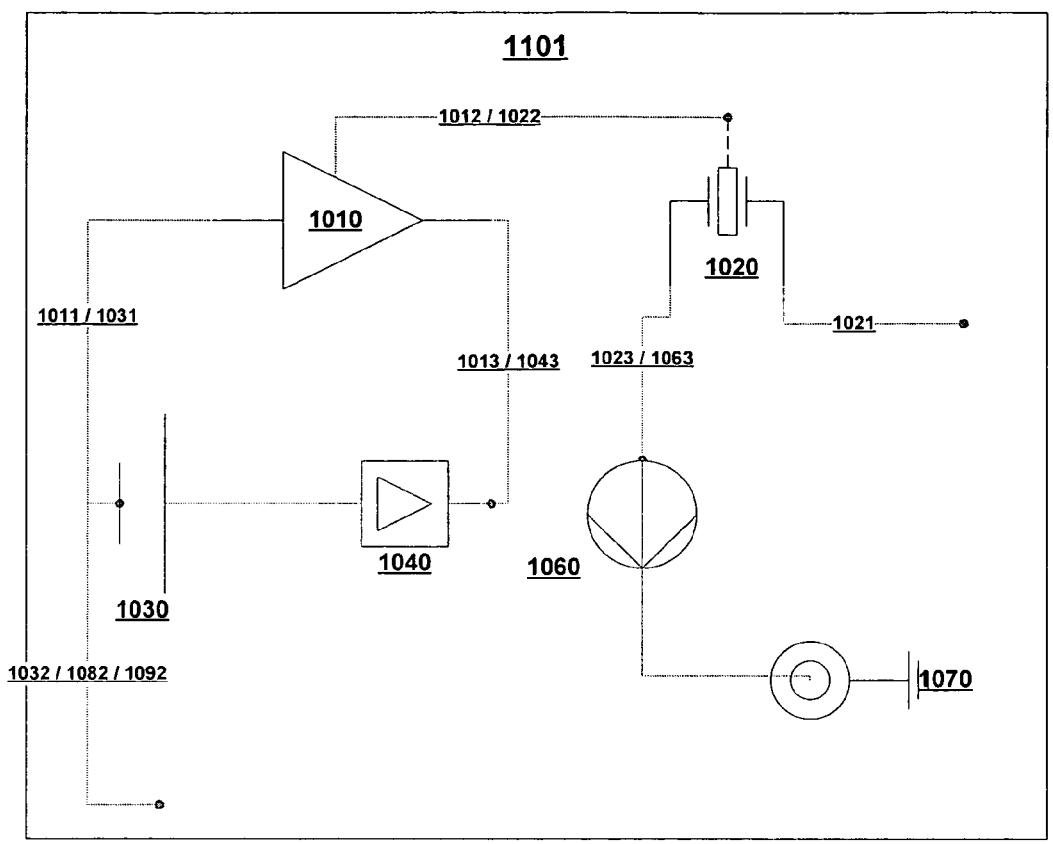
FIG. 11 is a virtual view according to an embodiment of the present invention.

FIG. 11 shows a virtual view that may be created by a VVSE as a view of pages 1001-1006 in FIG. 10(a). The elements 1010-1060 are shown in the virtual view, with virtual connections between them. As can be seen from the illustration, elements in the virtual view may be repositioned relative to one another in order to provide a view of the schematic that is different from the arrangement in which the elements are stored on the original pages. For example, the view shown in FIG. 11 may be more readily understandable, since elements have been repositioned to clearly indicate to which other elements they are connected. Similarly, the virtual view may be easier to manipulate than the page-based view, since there are fewer connections and the virtual connections do not have artificial terminal points at page boundaries. The VVSE may use various rules to determine the arrangement of elements.

In an embodiment of the present invention, the VVSE may create or retrieve virtual relationships between data objects selected from a CAD database. Such relationships may be functional, physical, or logical, and may be stored in the CAD database. The relationships may also be user-defined relationships. These relationships and objects also may be stored in a dynamic object virtual-view database, from which they can be reused. Systems using a dynamic object virtual-view database may be more responsive than other systems, since virtual views and connections may not have to be re-created from data stored in the CAD database. The use of functional relationships allows the VVSE to display only that portion of a complete CAD drawing which the user wishes to view, while still maintaining any connections or relationships with objects not shown in a particular view. For example, if a user selects the memory element of a CAD drawing for display by the VVSE, the VVSE may display only those elements that are part of the memory element of the system. Connections between those elements, as well as connections between the selected element and other elements that are not part of the selected element, may be displayed. Elements and relationships selected by the VVSE may be arranged and presented to the user in a format determined by the VVSE. In other embodiments, the arrangement of elements in the virtual view may be determined based on user inputs, such as an indication of the screen size desired for the virtual view. In one embodiment, the user may select elements to view based on constraints defined by the user. In another embodiment, the user can select elements to view based on their function. The user may provide additional constraints on objects or systems selected.

As an example, the elements shown in FIG. 10 may represent a functional group in a circuit, such as a graphics controller. When a user instructs the system to display the graphics controller, the VVSE may select the pages 1001-1006 that store elements of the graphics controller. The selection of pages 1001-1006 may be based on metadata describing elements stored on pages 1001-1006. The VVSE may then construct a virtual view of the controller by creating virtual connections between the elements stored on pages 1001-1006. Connections between elements that are part of the controller and elements that are not part of the controller (not shown) may be indicated by using, for example, terminal points on those connections. Connection 1021 in FIG. 10(b) may be a connection between element 1020, which is a part of the selected functional group, and an element (not shown) which is not a part of the functional group. As a further example, connection 1021 may represent a connection between the graphics controller and another subsystem, such as a display output.

In some embodiments of the invention, the VVSE may allow a user to netlist a virtual view generated by the VVSE. In Electronic Design Automation (EDA) applications, a "netlist" is a description of a circuit, including hierarchy, wiring, and connectivity. Hence, to "netlist" a circuit or other object means to generate such a description of the object. A netlist may be stored in multiple formats. The VVSE may allow a user to generate a netlist in a format specified by the user. Such netlisting may be useful for running simulations of virtual views, transferring a circuit description to other parties such as manufacturers, or manipulation and analysis of the circuit in other programs that are designed to use netlist formats. A user may be able to specify the contents of the netlist based on functionality, regardless of the page structure of the elements involved. A circuit design may also be netlisted into a new design, for example to transfer a subsystem from one circuit schematic to another. The VVSE may include a graphical user interface for displaying a netlist of a circuit or portion of a circuit. A user may then select elements in the circuit through the virtual view display or through the netlist interface. The netlist interface may further be used to select elements not presently displayed on the virtual view display.

Virtual views created by the VVSE may allow the user to modify the elements comprising the view. In some embodiments, this may allow a user to modify multiple pages, or elements stored on multiple pages, within a single virtual view. This may be advantageous, for example, when a complex structure or subsystem is stored across multiple pages. In order to simplify the editing and review process for complex circuits, in some embodiments the VVSE may store and present version and review tracking information. For example, the system may store each modification to an element or subsystem, allowing a user to "undo" a change previously made to the element. Similarly, the system may allow later users to review a modified element, indicating whether modifications are appropriate. In such embodiments, a version history is stored for each element. The version history may record, for example, each modification made to an element, information about the user making the modification, the time the modification was made, and other information. Thus a user wishing to review or modify a schematic may access the version history of each object, for example to determine what changes were made to the schematic or to make sure that new changes are made consistently with previous changes. In some embodiments, the version history may be stored in a dynamic virtual-view database.

In some embodiments of the present invention, the VVSE may use placement optimization algorithms to combine schematic views from multiple pages into a single schematic view. This may be desirable in order to provide a graphical overview of a complex system, while still maintaining a simple interface. Such combination may display an overview of the system without requiring the user to traverse multiple pages. In another embodiment, the topology of an element that spans multiple pages may be displayed on a single virtual view. This may similarly allow for an overview of the element without requiring navigation of multiple pages.

For example, FIG. 11 may represent a virtual view composed by the VVSE. The display window 1101 may be of a size indicated by the user as a desired size for the virtual view. The display window 1101 may be, for example, a graphical user interface window in a VVSE application that the user has set to a particular size on the screen. The system may examine a CAD drawing as illustrated in FIG. 10(a) or a virtual view as in 10(b) and use placement optimization algorithms to determine where in the display window 1101 each element and connection should be placed. Such algorithms may include steps such as calculating the space required to display each element at a particular resolution, calculating the space required for connections, and placing elements in the virtual view such that each connection to an element may be displayed within the display window. The algorithm may also position elements such that they are not immediately adjacent to edges of the display window, so that connections may be easily viewed and manipulated. For example, in FIG. 11 the placement optimization algorithm may indicate that element 1010 should not be placed in the far upper-left corner of the display window 1101 in order to allow connection 1011 and 1012 to be efficiently displayed. Other placement algorithms may select portions of pages containing elements to be displayed, and compress those portions into a single display. For example, connections 1082 and 1092 in FIG. 10(a) are compressed to a short, terminated connection in FIG. 11. Such compression may be useful, for example, when some pages contain both elements that a user wishes to display, and elements that are not required by the user.

In some embodiments of the present invention, the selection and display of data from the CAD database and creation of elements in the dynamic object virtual view database by the VVSE may be governed by rules. These rules may be defined or selected by the user. For example, a user may select a single element across all pages and apply pin-to-pin constraints on all elements thus selected. When a user selects an element, he may indicate that the system is to select the element across all pages, i.e., select every occurrence of the same element from every page on which an instance of the element is stored. The VVSE may display the selected element in a virtual view, or otherwise indicate that the element has been selected. The user may then specify pin-to-pin constraints, such as indicating that a specific connection on the element is designed to be used as a clock input. The system may then apply user-indicated constraints to the element across all pages on which the unit is stored. Similarly, the user may indicate constraints on a element displayed in a virtual view, and then indicate that the constraint should be applied across all pages.

In some embodiments, a user may manually input information describing the functions of certain elements. The user may specify, for example, that each of several elements should be described as part of a memory interface functional group. The VVSE may then later be used to select objects marked with the same function across multiple schematic pages, and combine them on a single display. In the example, a user may select all objects marked as part of the memory interface function, and the VVSE may display all objects previously so marked on a single display. A rule relating to this selection may direct the VVSE to select all objects having a description matching that specified by the user into the virtual view. In the example, the rule may be to select all objects described as being part of the memory interface system. Descriptions of elements entered by the user in this manner may be stored in a dynamic object virtual-view database as metadata.

Other rules and types of rules may be used. For example, a rule may direct the VVSE to select elements and their related connectivity based on simulation grouping. This may allow a user to select objects by inclusion to or exclusion from a simulation group. Thus, when a user selects an element for simulation, the VVSE may apply simulation-grouping rules to select other elements required to perform a simulation of the element selected by the user. Each virtual view schematic may then become a simulation case. Such rules and groupings may be useful, for example, when a user wishes to select elements of a system and perform simulations of them without being forced to select other elements necessary for the simulation, but which are of little immediate interest to the user.

EXAMPLES

The following specific non-limiting examples are provided to illustrate various embodiments of the invention.

In one example, a user selects a specific net in a schematic and requests a rendering including all components attached to the net. The VVSE then selects those components attached to the net and displays them in a virtual view.

In another example, the user indicates specific pages and a specific net, and requests a view including all components attached to the net occurring on the specified pages. The VVSE then selects those components attached to the net indicated by the user that occur on the pages specified by the user. The components are then displayed in a virtual view.

In another example, a user specifies a property, such as a memory interface function. The user selects one or more nets manually or by specifying a category, such as a data bus. The user then requests components matching the function and category, i.e., memory interface components in the data bus category. The VVSE then selects those components and display them in a virtual view.

It will be understood that other methods and types of selection are possible, and above examples provided for illustration purposes.

As used herein an "element" refers to an item or object stored or represented in a CAD drawing. An element may be any item within a schematic, such as a component, a net, a page from a page-based system, or a connection between components. An element may be an individual item, such as a connection point or a wire, or it may be a group of items, such as a memory interface. A group of objects that are related physically, logically, or functionally may be referred to as a subsystem or as an element.

Although the present invention has been described with reference to particular example and embodiments, it is understood that the present invention is not limited to those example and embodiments. The present invention as claimed therefore includes variations from the specific examples and embodiments described herein, as will be apparent to one of skill in the art.

What is claimed is:

1. A method comprising using a processor to perform the steps of:
   in response to a user selection of an element of a CAD drawing, the processor selecting a plurality of pages on which that element occurs from a computer file representing a multi-page CAD schematic;
   further in response to the user selection of the element, for each page selected, the processor selecting elements and connections between elements stored on the plurality of pages;
   further in response to the user selection of the element, responsive to the processor selecting elements the processor creating virtual connections between the elements selected from the plurality of pages; and
   further in response to the user selection of the element, the processor rendering the elements and virtual connections on a single display.

2. The method of claim 1, wherein the pages define interconnect terminals between pages.

3. The method of claim 1, further comprising the step of storing the plurality of elements, relationships between the elements, or both in a dynamic object virtual-view database.

4. The method of claim 1, wherein the processor selecting of elements comprises:
   the processor selecting at least one first element;
   the processor applying rules to the selected element; and
   the processor selecting other elements based on the rules applied to the first element.

5. The method of claim 4, wherein the at least one first element is a net.

6. The method of claim 4, wherein the at least one first element is a component.

7. The method of claim 4, wherein the at least one first element is a page.

8. The method of claim 4, wherein the rules are defined by the user.

9. The method of claim 4, wherein the at least one first element is selected based on a rule.

10. A method comprising using a processor to perform the steps of:
    responsive to a user selection of a element of a CAD drawing, the processor selecting pages from a multi-page CAD schematic on which that element occurs;
    further responsive to the user selection of the element, the processor combining portions of the selected pages on which the element occurs into a common rendered view on a computer display; and
    further responsive to the user selection of the element, the processor creating virtual connections of the element on the selected pages and rendering inter-page connections of the element on the display.

11. The method of claim 10, further comprising the step of, responsive to a request, simulating the element shown in the schematic.

12. The method of claim 11, wherein the schematic comprises a virtual view.

13. A method for displaying elements stored in a CAD database, comprising using a processor to perform the steps of:
    responsive to a user request to display a element, the processor selecting pages on which the element is stored; and
    further responsive to the user request to display the element, the processor displaying portions of the selected pages on a single display;
    further responsive to the user request to display the element, the processor creating virtual connections of the element on the selected pages;
    wherein the portions of the selected pages are compressed to display only regions of the selected pages in which the selected element occurs.

14. A non-transitory machine-readable medium containing program instructions for execution on a processor, which when executed by the processor, cause the processor to perform:
    responsive to a user selection of an element of a CAD drawing, the processor selecting a plurality of pages on which that element occurs from a CAD database;
    further responsive to the user selection of the element, for each page selected, the processor selecting elements and connections between elements stored on the plurality of pages;
    further responsive to the user selection of the element, in response to the processor selecting elements, the processor creating virtual connections between the elements selected from the plurality of pages; and
    further responsive to the user selection of the element, the processor rendering the elements and virtual connections on a single display.

15. The machine-readable medium of claim 14, further comprising storing the selected elements, the virtual connections, or both in a dynamic object virtual-view database.

16. The machine-readable medium of claim 14, wherein the processor selecting of elements and connections comprises applying rules.

17. The machine-readable medium of claim 14, further comprising responsive to a request, simulating said elements.

18. A computer program product comprising a non-transitory computer-readable medium having instructions which, when performed by a computer, maintain a graphical user interface for viewing CAD drawing elements, the graphical user interface comprising:
    a first interface to display a virtual view of a CAD element; and
    a second interface to display a list of CAD elements selectable for display in the virtual view in the first interface, wherein upon display of the CAD element, a processor:
    selects a plurality of pages on which at least one of the list of CAD elements occurs,
    selects elements and connections between elements stored on the plurality of pages,
    creates virtual connections between the elements selected from the plurality of pages, and the virtual view displays the virtual connections between the CAD element and the at least one of the list of CAD elements on a single display.

19. The computer program product of claim 18, wherein the first interface is further to display simulations of the elements.

20. The computer program product of claim 18, further comprising a third interface for displaying version and tracking information.

21. The computer program product of claim 18, wherein the first interface comprises an infinite canvas on which CAD elements are manipulated without constraints introduced by page divisions.

22. A method for creating a CAD schematic, comprising using a processor to perform the steps of:
the processor generating a CAD schematic in response to a user selection of an element of a CAD drawing entered into a workspace via a graphical user interface, wherein the schematic comprises elements selected from a plurality of pages and virtual connections between elements selected from the plurality of pages;
further in response to the user selection of the element, the processor parsing the workspace into pages and distributing portions of the schematic among the pages;
further in response to the user selection of the element, in response to the processor parsing the workspace into pages, the processor aligning schematic elements of each page to accommodate page borders; and
further in response to the user selection of the element, the processor storing the schematic in a page-based system so that an element in a first page and an element in a second page and their virtual connections can be rendered on a single display.

23. A system comprising:
a memory for storing CAD drawing elements; and
a processor in communication with the memory, upon a user selection, the processor to:
render CAD elements from a plurality of pages on a display,
further in response to the user selection and rendering the CAD elements on a display, establish virtual connections between those of the elements for which direct connections are absent, and
further in response to the user selection and establishing the virtual connections between elements, render virtual connections between the elements on a single display.

24. The system of claim 23, wherein the processor is further to render direct connections between those of the elements for which direct connections are present.

25. The system of claim 23, the processor further to record revision and review tracking information for the elements.

* * * * *